Patented Feb. 2, 1943

2,309,691

UNITED STATES PATENT OFFICE 2,309,691

PREPARATION OF QUATERNARY ONIUM COMPOUNDS

James L. Brannon, Plainfield, N. J., assignor to Bakelite Corporation, a corporation of New Jersey No Drawing. Application March 8, 1941,
Serial No. 382,344

7 Claims. (Cl. 260—440)

This invention relates to the preparation of quaternary onium basic derivatives. The application is a continuation-in-part of a copending application, Serial No. 176,809, filed November 27, 1937, Patent No. 2,234,548, of March 11, 1941, for Phenolic resins.

Methods are known and described for making salts of such compounds. The most commonly used method consists in adding on to a tertiary amine an alkyl or aralkyl halide or sulfate and producing the quaternary substituted ammonium salt of an inorganic acid; for example, trimethylamine and benzyl chloride readily react to produce trimethyl benzyl ammonium chloride. In a similar manner the quaternary phosphonium, arsonium and stibonium salts are obtained.

For many purposes, however, the salt of the inorganic acid itself is not the desired product but instead a basic derivative, such as the hydroxide, carbonate or phenate. The conversion of the salt to the hydroxide in some cases can be accomplished electrolytically, but in many cases the product is decomposed. Where electrolytic means are not permissible, the known methods for obtaining the basic derivatives from the salts are either expensive or cumbersome, principally because the onium compounds, both salts and bases, are very soluble in water. If sodium hydroxide, for example, is added to an aqueous solution of a quaternary ammonium chloride, all the components are water-soluble and it is difficult to separate the sodium chloride from the quaternary ammonium hydroxide solution. If expensive metal hydroxides are used, as silver hydroxide, filtering is required; and this becomes complicated because the quaternary onium hydroxides are strong solvents, particularly for cellulose, and the usual filters cannot be used.

The present invention depends on the discovery of a convenient and efficient means for obtaining the pure quaternary onium phenate from any of the quaternary onium salts of inorganic acids; other basic derivatives can be made from the phenate. It has been found that, although the quaternary onium phenates are very soluble in water, their phenol solutions are but slightly water-soluble. In general, the phenol solution reaches its lowest water-solubility when one mol of a quaternary onium phenate is dissolved in about six to ten mols of the corresponding phenol, although ratios of from two to one hundred or more mols of the phenol per mol of the phenate are effective.

In brief the procedure of the present invention is that of taking or preparing a quaternary onium salt of an inorganic acid and reacting therewith a fixed alkali, such as sodium hydroxide, and a phenol. The onium base is thereby liberated and the phenate is formed. Excess phenol is used to provide the solvent for extracting the phenate from the aqueous solution.

The following examples, given for illustration, describe the preparation of phenates and their separation from aqueous solutions of quaternary onium salts.

*Example 1.*—To 1 mol of trimethyl benzyl ammonium chloride in 10 per cent aqueous solution is added 1 mol of sodium hydroxide in 25 per cent aqueous solution and 6 mols of melted phenol. The mixture separates into two phases on addition of the phenol. The mixture is stirred for 2 to 3 minutes, cooled to 20° C. and allowed to settle for 30 minutes during which time two layers are formed. The top layer, consisting principally of a water solution of sodium chloride, is drawn off and discarded. The lower layer is a phenol solution of trimethyl benzyl ammonium phenate containing 3 per cent of water. About 97 per cent of the phenol used and 97 per cent of the theoretical trimethyl benzyl ammonium phenate are contained in the lower layer. By heating under reduced pressure the water can be removed to obtain a pure phenol solution of trimethyl benzyl ammonium phenate. By further heating under reduced pressure the excess phenol can be removed to obtain the pure trimethyl benzyl ammonium phenate.

*Example 2.*—To 1 mol of dimethyl phenyl ethyl ammonium ethyl sulphate (prepared from dimethyl aniline and diethyl sulphate) in 60 per cent aqueous solution is added 1 mol of sodium phenate in 50 per cent aqueous solution. At this point the mixture is a clear solution. Six mols of phenol and an equal weight of distilled water are then added, whereupon the mixture becomes turbid. The mixture is cooled to 25° C. and stirred for 2 to 3 minutes. After settling for about 1 hour, two layers are formed consisting of a top aqueous layer and a lower oily layer. The lower oily layer contains 97 per cent of the phenol added and 0.95 mol of base calculated as dimethyl phenyl ethyl ammonium phenate. The top layer contains practically all of the sodium ethyl sulphate produced in water solution. Separation and purification are obtained as in the preceding example.

*Example 3.*—To 1 mol of tetramethyl arsonium iodide in 10 per cent aqueous solution is added 8 mols of phenol and 1 mol of 5 per cent sodium hydroxide solution. The turbid mixture is stirred for 3 minutes, cooled to 25° C. and allowed to settle for 1 hour. Two layers consisting of a top aqueous layer and a lower oily layer are formed. The lower layer contains 96 per cent of the phenol added and 96 per cent of the theoretical yield of tetramethyl arsonium phenate. The upper layer contains practically all of the sodium iodide and 4 per cent of the phenol used. The lower layer contains 2.8 per cent of water which can be removed by boiling off under reduced pressure.

*Example 4.*—To 1 mol of diethyl methyl sulphonium bromide in 10 per cent aqueous solution is added 1 mol of sodium orthocresolate in 10 per cent aqueous solution. Four mols of orthocresol are then added, whereupon the mixture becomes turbid. After cooling to 25° C. and settling for 1 hour the lower oily layer is drawn off. A yield of 97 per cent of diethyl methyl sulphonium orthocresolate is obtained in solution in orthocresol. The aqueous layer contains 2 per cent of the orthocresol used.

*Example 5.*—One hundred grams of phenol is dissolved in 1900 grams of distilled water. To this solution is added 40 grams of a 40 per cent aqueous solution of trimethyl benzyl ammonium hydroxide. After stirring, the mixture is cooled to 20° C. and allowed to settle for 1 hour. The lower layer is then drawn off. Sixty grams of phenol is recovered from this lower layer by distillation under reduced pressure. The residue from this distillation may be used over again for the recovery of phenol from aqueous solutions if the distillation is carried out under a sufficiently reduced pressure to prevent decomposition of the trimethyl benzyl ammonium phenate.

It will be noted from the above example that the order of adding the various ingredients is of no particular importance. All that is necessary to extract the quaternary onium phenate from a water solution of the onium salt of the inorganic acid is to add sufficient fixed alkali to liberate the free base, then add sufficient phenol to form the phenolate and extract the phenolate with more phenol.

In general any of the quaternary onium compounds in the form of salts of inorganic acids as the halides and sulphates, including the ammonium, phosphonium, arsonium, stibonium, sulphonium, or the free bases of these compounds, can be converted into phenates in accordance with the foregoing examples; those found most useful are the salts of the penta and tetravalent onium compounds. Likewise, the phenols generally serve to form phenates, though the lower phenols, as phenol, cresol, etc. on account of their availability and utility in other relations are usually selected.

As set out in the copending application, identified above, the basic derivatives are particularly useful for catalyzing the reaction of a phenol with formaldehyde. For this purpose there is no reason to add the compound in the form of a free base because when so added to the phenol and formaldehyde solution the phenate is formed anyway; therefore the phenate itself can be used whenever a phenol resin catalyst is desired. For other purposes, however, it may be desirable to have it in the form of the carbonate or hydroxide. To obtain the carbonate, $CO_2$ can be passed through an aqueous solution of the quaternary onium phenate simultaneously with steam distillation whereupon the phenol is removed. To obtain the free base any of the known processes for converting a soluble carbonate to the hydroxide can be used; the most commonly used process is to add calcium hydroxide to an aqueous solution of the carbonate whereupon calcium carbonate is precipitated and the free base liberated, and the calcium carbonate can be removed by centrifuging or by settling.

What is claimed is:

1. Process of preparing a basic derivative of a quaternary substituted onium compound selected from the group consisting of the ammonium, phosphonium, arsonium, stibonium and sulphonium compounds which comprises reacting a salt of the compound with a metal hydroxide and a phenol, the phenol being present in sufficient amount to act as a solvent extracting medium for the phenate that is formed.

2. Process according to claim 1 in which the phenate is converted to the hydroxide.

3. Process according to claim 1 in which the phenate is converted to the carbonate by means of carbon dioxide.

4. Process according to claim 1 in which the phenate is converted to the carbonate and the carbonate to the hydroxide by means of calcium hydroxide.

5. Process of preparing a basic derivative of a quaternary substituted onium compound selected from the group consisting of the ammonium, phosphonium, arsonium, stibonium and sulphonium compounds which comprises reacting a salt of the compound in aqueous solution with a metal hydroxide together with a phenol, the metal hydroxide being in sufficient amount to liberate the free onium base and the phenol in amount corresponding to about six to ten mols for each mol of the phenate formed in the reaction to act as a solvent for the phenate, separating the phenol solution of the phenate from the aqueous solution, and obtaining the phenate from the phenol solution.

6. Process of preparing a basic derivative of a quaternary substituted onium compound selected from the group consisting of the ammonium, phosphonium, arsonium, stibonium and sulphonium compounds which comprises reacting an aqueous solution of a halide of the compound with an alkali hydroxide and a phenol to form the phenate of the compound, and separating the phenate from the aqueous solution by dissolving in a phenol.

7. Process of preparing a basic derivative according to claim 6 in which the phenate is converted to the hydroxide.

JAMES L. BRANNON.